United States Patent [19]
Boucher

[11] Patent Number: 6,014,150
[45] Date of Patent: Jan. 11, 2000

[54] SYSTEM AND METHOD OF DEFINING AND EMPLOYING BEHAVIORS FOR ARTICULATED CHAINS

[75] Inventor: Yves Boucher, Terrebonne, Canada

[73] Assignee: Avid Technology, Inc., Tewksbury, Mass.

[21] Appl. No.: 08/946,274

[22] Filed: Oct. 7, 1997

Related U.S. Application Data

[60] Provisional application No. 60/054,552, Aug. 1, 1997.

[51] Int. Cl.[7] .................................................. G06T 15/00
[52] U.S. Cl. ........................... 345/473; 345/474; 345/953
[58] Field of Search ..................................... 345/473, 474, 345/953

[56] References Cited

U.S. PATENT DOCUMENTS

| | | | |
|---|---|---|---|
| 5,336,982 | 8/1994 | Backes | 318/568.22 |
| 5,416,899 | 5/1995 | Poggio et al. | 345/953 |
| 5,506,949 | 4/1996 | Perrin | 345/473 |
| 5,581,665 | 12/1996 | Sugiura et al. | 395/86 |
| 5,623,428 | 4/1997 | Kunii et al. | 364/578 |
| 5,625,577 | 4/1997 | Kunii et al. | 364/578 |
| 5,767,861 | 6/1998 | Kimura | 345/473 |
| 5,835,693 | 11/1998 | Lynch et al. | 345/473 |
| 5,847,716 | 12/1998 | Hashimoto | 345/473 |
| 5,867,631 | 2/1999 | Sato et al. | 700/262 |
| 5,877,778 | 3/1999 | Dow et al. | 345/474 |
| 5,889,528 | 3/1999 | Zhao | 345/436 |
| 5,889,532 | 3/1999 | Boucher et al. | 345/473 |
| 5,909,218 | 6/1999 | Naka et al. | 345/419 |
| 5,912,675 | 6/1999 | Laperriere | 345/473 |

FOREIGN PATENT DOCUMENTS

WO 97/14102  4/1997  WIPO .
WO 97/40471  10/1997  WIPO .

OTHER PUBLICATIONS

A. James Stewart and James F. Cremer, "Algorithmic Control of Walking" Proceedings 1989 IEEE International Conference on Robotics Automation, Scottsdale, vol. 3, May 15, 1989, pp 1598–1603.

Moon R. Jung and Norman Badler, "Human–like Agents With Posture Planning Ability"SPIE vol. 1829, Cooperative Intelligent Robotics in Space III, Nov. 1992, pp 207–218.

Ken Shoemake, "Animating Rotation With Quaternion Curves" Proceedings of SIGGRAPH 1985, San Francisco, vol. 19, No.:3, pp. 245–254.

Watt et al.:"Advanced Animation and Rendering Techniques—Theory and Practice", ACM Press, New York, New York, 1992, Chapter 16, Animating Articulated Structures, pp. 369–384.

Softimage|3D Animating—A Comprehensive User's Guide, Softimage Inc., Montreal, Canada, 1996, pp. 129–142, 1306–1311.

*Primary Examiner*—Mark K. Zimmerman
*Assistant Examiner*—Albert K. Lee
*Attorney, Agent, or Firm*—Robert P. Stratton; Arne I. Fors; Omar A. Nassif

[57] ABSTRACT

A system and method for defining and employing behaviours for articulated chains in computer animations. At least one control, such as a shape control or a resolution plane control, is defined for the articulated chain and is employed as a constraint by the animation engine when animating the chain with inverse kinematics. Each control comprises two or more keys, each key comprising a couple of an effector direction vector and an associated constraint. In the case of shape control keys, the associated constraints comprise a list of preferred limb orientations and in the case of resolution plane control keys, the associated constraints comprise a preferred orientation for the resolution plane. For any given goal, selected control keys are interpolated with appropriate weightings to obtain a resulting constraint to be employed by the animation engine.

16 Claims, 2 Drawing Sheets

SYSTEM AND METHOD OF DEFINING AND EMPLOYING BEHAVIORS FOR ARTICULATED CHAINS

The application claims benefit of provisional application 60/054,552 filed Aug. 1, 1997.

FIELD OF THE INVENTION

The present invention relates to a system and method of using articulated chains in computer animation systems. More particularly, the present invention relates to a system and method of defining and employing behaviours for articulated chains.

BACKGROUND OF THE INVENTION

Articulated chains are commonly employed in computer animation systems, such as the SOFTIMAGE|3D product sold by the assignee of the present invention, to model a variety of objects. In particular, articulated chains are often used to produce animation models of human beings and other living organisms with articulated bodies and limbs.

As described in "Advanced Animation and Rendering Techniques, Theory and Practice", by Alan Watt and Mark Watt, 1992, ACM Press, the contents of which are incorporated herein by reference, an articulated chain comprises a chain root, one or more joints separated by fixed length limbs and an end effector. Each joint in an articulated chain can have one or more degrees of freedom and can have defined ranges of movement it can make.

For example, an articulated chain defined to represent a human arm can have a joint defined to represent the shoulder and another joint defined to represent the elbow. The shoulder joint can be defined with three degrees of freedom in rotation and can be limited to prevent movement of the arm to a position behind the modelled human's back. The elbow joint can be defined with two degrees of freedom in rotation and can be constrained to limit the angle of the joint to angles between about ten degrees (representing the position at which the forearm of the model will be adjacent to the upper arm) and about one hundred eighty degrees (representing a straight arm).

Once an articulated chain has been defined, it is animated by an animation engine using, most commonly, inverse kinematics (IK). With IK, the chain is animated by indicating a desired final position or "goal" for the end effector of the chain. The IK animation engine will then calculate the position and orientation of each limb of the articulated chain so that the end effector reaches the desired goal. The set of positions and orientations for all of the limbs of a chain which are determined by the IK animation engine is called a "solution".

In most cases, more than one solution exists for any given goal. Two or more given solutions can have different "shapes", as defined by the positions and orientations of limbs. On the other hand, using a solution with a given shape, an infinite number of other solutions can be obtained by rotating the whole articulated chain around the axis going through the root and the end effector.

While inverse kinematics is one of the more useful techniques for animating articulated chains, it does suffer from some disadvantages. A commonly known disadvantage is the inability of the IK animation engine to choose the "correct" solution, or the solution that the animator desires, from amongst the many existing solutions. A co-pending U.S. application Ser. No. 08/691,340 to the present inventor and Réjean Gagné and assigned to the assignee of the present invention, teaches a system and method for performing IK on articulated chains which provides additional information, in the form of constraints, which are employed by the IK animation engine to control the articulated chain. The contents of this co-pending application are incorporated herein by reference.

While the additional constraints provided by the above-mentioned co-pending U.S. application are useful to the IK animation engine, it is generally time consuming and/or tedious for an animator to define such constraints for each desired goal for the end effector in space. Further, if the end effector has to reach the same goal many times during a desired motion sequence, then the animator will also have to reposition those constraints each time in order to get the desired solution for the articulated chain.

It is therefore desired to have a system and/or method of obtaining correct solutions of articulated chains in a simple, convenient and intuitive manner.

SUMMARY OF THE INVENTION

It is an object of the present invention to provide a novel system and method of defining and employing behaviours for articulated chains animated with inverse kinematics or the like.

According to a first aspect of the present invention, there is provided a method of defining a behaviour for an articulated chain comprising a chain root, at least one joint, at least one limb and an end effector by defining a control comprising at least two couples for said chain, each said couple comprising a vector, indicating a direction relative to said chain root, and a constraint for use in animating said chain via inverse kinematics, said constraint being a preferred configuration for said articulated chain when said end effector is located in said direction from said chain root.

Preferably, the constraint comprises a preferred orientation for each of said at least one limbs in said articulated chain and/or a preferred orientation for a resolution plane which passes through the chain root and the end effector.

According to another aspect of the present invention, there is provided a method of animating an articulated chain comprising a chain root, at least one joint, at least one limb and an end effector using inverse kinematics, comprising the steps of:

(i) defining a control comprising at least two couples for said chain, each said couple comprising a vector, indicating a direction relative to said chain root, and a constraint for use in animating said chain via inverse kinematics, said constraint being a preferred configuration when said end effector is located in said direction from said chain root;

(ii) defining a goal for said end effector;

(iii) determining a weight for each said couple of said control, said weight indicating the degree of correspondence between said direction of said couple and the direction between said chain root and said goal;

(iv) interpolating between said constraints of all said at least two couples according to their relative weights to obtain a resultant constraint; and (v) animating said chain with said resultant constraint.

Preferably, after step (i) is complete, steps (ii) through (v) can be re-performed as desired. Also preferably, the constraint comprises a preferred orientation for each of the limbs and/or a preferred orientation for a resolution plane, the resolution plane passing through the chain root and the end effector.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
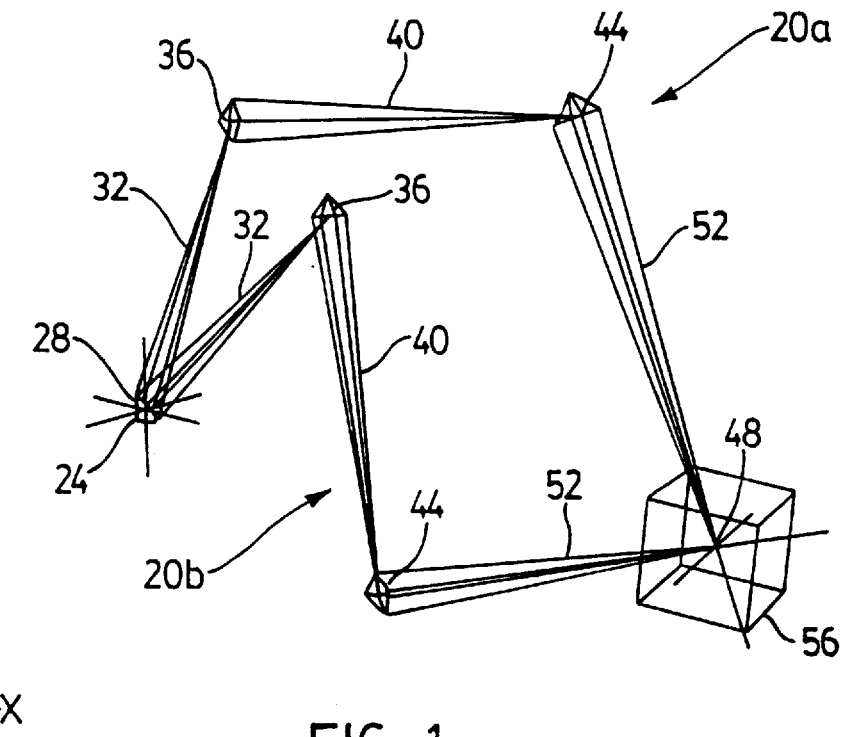
FIG. 1 shows a schematic representation of two solutions of a three-limb articulated chain reaching a goal with two different shapes.

As mentioned above, when an IK animation engine animates an articulated chain to place its end effector at a goal, there generally exists a variety of possible solutions for the chain. FIG. 1 shows a schematic representation of a three-limb articulated chain 20, with two different shapes. As shown, chain 20 includes a chain root 24, indicated by the cross hairs, a first joint 28 coincident with chain root 24, a first limb 32 which spaces a second joint 36 a fixed distance from first joint 28, a second limb 40 which spaces a third joint 44 a fixed distance from second joint 36 and an end effector 48, indicated by the cross-hairs, which is a spaced a fixed distance from third joint 44 by third limb 52. In both solutions, end effector 48 intersects a goal 56, indicated in the Figure as a cube. As shown, the shape identified as 20a is much different than that identified as 20b, despite the fact that chain root 24 and end effector 48 in each solution are coincident.

Figure 2:
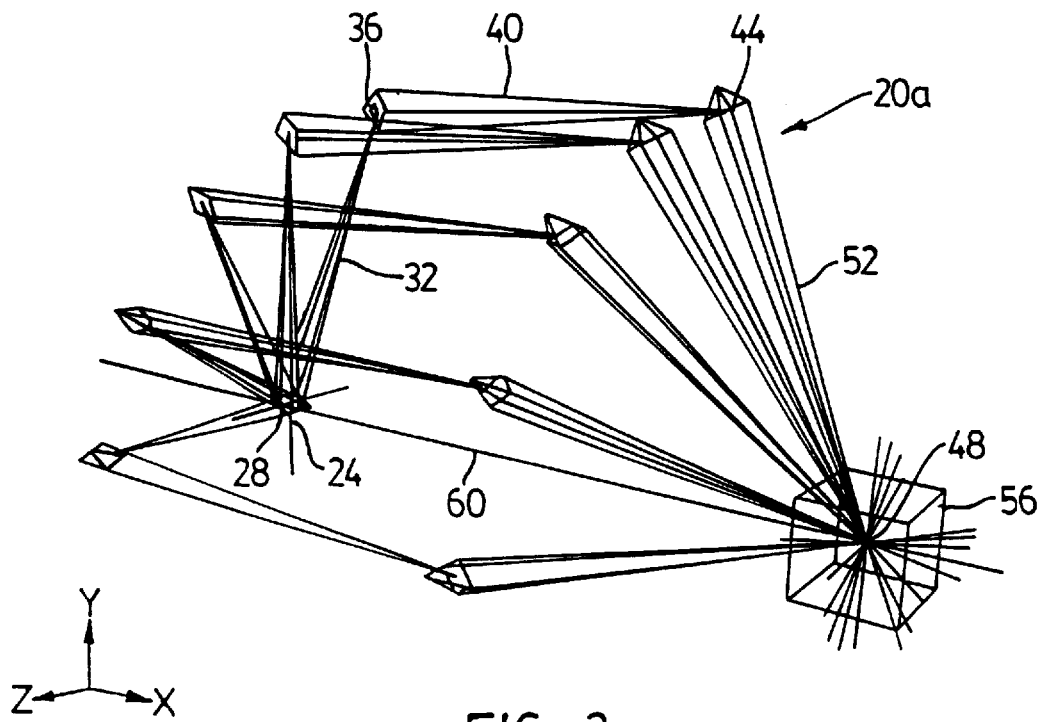
FIG. 2 shows a schematic representation of the articulated chain of FIG. 1 reaching the goal using a single shape but with five different orientations of the resolution plane.

As also mentioned above, an infinite number of solutions with different orientations of the resolution plane, as described below, but with the same shape exist for a chain. FIG. 2 shows some of the possible additional solutions for chain 20 which have been obtained by rotating solution 20a about an axis 60 extending from chain root 24 to end effector 48.

Prior art versions of SOFTIMAGE|3D provide two techniques to control the solution for an articulated chain. The first technique involves specifying a preferred shape of a chain and this preferred shape influences how the IK animation engine moves the limbs as it moves the end effector to a goal. Specifically, the IK animation engine will attempt to maintain the preferred shape, as much as possible, while it animates the chain. The specification of the preferred shape is usually accomplished by originally defining the chain in its preferred shape, although the preferred shape can be redefined subsequently by the animator.

The second technique involves orienting the resolution plane, which is a plane attached to the chain and passing through at least the end effector and the chain root. In the present implementation of the invention, the resolution plane is, by default, perpendicular to the z-axis of the joint coincident with the chain root. The animator has the ability to rotate this resolution plane around the axis going through the root and the end effector axis without affecting the current shape of the chain. This manipulation of the resolution plane is done through the use of special constraints (described in a co-pending U.S. application Ser. No. 08/691,340, as mentioned above).

The preferred shape technique and the control of the orientation of the resolution plane technique are used in combination by the IK animation engine when animating a chain. While these two techniques provide a reasonable level of control, they are low level techniques and generally require the animator to make appropriate settings for each desired animated movement of the articulated chain.

As described below in more detail, the present invention provides a way to use such low level techniques to define and associate a behaviour to the articulated chain, the behaviour comprising one or more controls for the chain and each control comprising a set of keys for the chain. Presently, a shape control and a resolution plane control are provided, although other suitable controls can be provided as will be apparent to those of skill in the art.

A shape control comprises two or more keys, each key comprising a couple that associates an effector direction with a chain shape. Each key couple $\{E_{DIR}, O_{LIST}\}$ consists of an effector direction vector, $E_{DIR}$, which is a unit vector indicating the direction from the chain root to the end effector of the chain and a list of limb orientations, $O_{LIST}$, defined as $O_{LIST} = \{O_{LIST\_1}, O_{LIST\_2}, O_{LIST\_3}, \ldots\}$, where $O_{LIST\_1}$, $O_{LIST\_2}$, etc. comprise preferred orientations of limbs 1, 2, etc. Thus, for each shape key in the shape control, a preferred orientation is defined for each limb in the articulated chain for a given effector direction vector.

It is presently contemplated that the preferred method of constructing a shape control will be for the animator to interactively position the end effector and limbs of the articulated chain to a key orientation and to then take a "snapshot" of the that orientation, wherein the effector direction vector and the preferred limb orientations are entered as a key in the shape control for the chain. It is however, also contemplated that keys for shape controls can be directly input by an animator, via a text editor or any other suitable means as will occur to those of skill in the art.

To simplify the definition of shape controls, a symmetry operator is provided which allows a shape control to be produced which is related to an existing control via a symmetry. For example, a shape control which has been defined for an articulated chain modelling a human right leg can have the symmetry operator applied to it to allow the resulting shape control to be used for an articulated chain representing a human left leg.

The other control which is currently provided in the present invention is the resolution plane control. The resolution plane control comprises two or more keys each comprising an effector direction vector $E_{DIR}$ (defined as in the shape control described above) and a resolution plane direction vector, $P_{DIR}$, where $P_{DIR}$ is a unit vector taken at the chain root and which is used to orient the resolution plane. $P_{DIR}$ can be implemented as a vector contained in the resolution plane or as a vector perpendicular to the resolution plane of the chain, etc. requiring only that the relationship between $P_{DIR}$ and the orientation of the resolution plane be known.

As with the shape control discussed above, it is presently contemplated that the preferred method of constructing keys for a resolution plane control will be for the animator to interactively position the end effector and orient the resolution plane of the articulated chain and to then take a snapshot wherein the effector direction vector and the preferred resolution plane direction vector are entered as a key in the resolution plane control for the chain. It is however, also contemplated that keys for resolution plane controls can be directly input by an animator, via a text editor or any other suitable means as will occur to those of skill in the art. As with the shape control, a symmetry operator is provided to allow a resolution plane control to be converted about a symmetry, for example from a right human arm to a left human arm.

When a control, either a shape control or a resolution plane control or both, has been defined for a chain and selected for use, they are employed by the IK animation engine as further constraints on movement of the chain. Once an animator has indicated a desired goal for the end effector and has selected either a shape control or resolution plane control, or both, the IK animation engine examines the appropriate control or controls to derive suitable constraints.

Specifically, the IK animation engine determines $G_{DIR}$ for the desired end effector goal, where $G_{DIR}$ is a unit vector from the chain root to the end effector goal. The IK animation engine next examines the set, or sets, of control keys and weights each key i in a set according to the proximity of $G_{DIR}$ to the $E_{DIR}$ defined for the key. This weighting is determined according to $W_i = \pi - \theta_i$, where $\theta_i$ is the angle between $E_{DIR}$ and $G_{DIR}$, in the range of zero to $\pi$ radians. If desired, this weighting can be determined instead according to $W_i = (\pi - \theta_i)^M$, where M is an integer greater than or equal to 2. This latter weighting method increases the influence of control keys which are close to $G_{DIR}$ and reduces the influence of those which are farther away from $G_{DIR}$. It is contemplated that, for circumstances wherein a large number of control keys are defined for a chain, this latter weighting method will be preferred.

If a shape control has been specified, a resulting list of preferred orientations of each limb of the chain, $O_{RESULT}$, is determined by interpolating the $O_{LIST}$ for each key i with its corresponding weight $W_i$. Specifically, interpolation between pairs of list of orientations is performed on a limb by limb basis, as explained in more detail below. In the following discussion, the interpolation between two orientations can be performed, for example, by converting each orientation into a unit quaternion representation and interpolating those unit quaternions and then converting the results back into the original representation. Quaternion notation and operations are well known and are described, for example, in "Animating Rotation with Quaternion Curves", Ken Shoemake, Proceedings of SIGGRAPH 1985, San Francisco, Volume 19, Number 3, pp. 245 to 254, the contents of which are incorporated herein by reference.

For each limb j of the articulated chain, its final preferred orientation $O_{RESULT\_j}$ is determined by interpolating the preferred orientations of that limb in each key, according to the weightings of the keys. In the following, the notation $O_{[j,i]}$ means the preferred orientation of limb j in shape control key i.

Given n shape control keys numbered from 1 to n, the preferred orientations associated with limb j are combined, two orientations at a time according to the following steps:

(i) $O_{RESULT\_j}$ is set to be equal to $O_{[j,1]}$;
(ii) i is set to 1 and steps (iii) and (iv) are performed n−1 times;
(iii) i is set to be equal to i+1; and
(iv) interpolate between $O_{RESULT\_j}$ and $O_{[j,i]}$ with respective weights $$W = \sum_{x=1}^{i-1} W_x$$

and $W_i$ and store the results in $O_{RESULT\_j}$.

The resulting orientation $O_{RESULT\_j}$ is then applied to limb j and the process is repeated for each remaining limb in the chain so that a list of the preferred orientation of each limb of the chain $O_{RESULT}$ is obtained for the chain and $O_{RESULT}$ is employed by the IK animation engine when animating the chain to move the end effector to its goal.

In the case of a resolution plane control, interpolation between two direction vectors $DIR_1$ and $DIR_2$ with weights $W_1$ and $W_2$ (determined as described above from the angle between $G_{DIR}$ and $E_{DIR}$ for the respective key) can be performed using, for example, a standard spherical interpolation method, as described in chapter 16 of the above-mentioned reference by Alan Watt and Mark Watt. In this method, the angle $\alpha$ between $DIR_1$ and $DIR_2$, which is between zero and $\pi$ radians, is first determined. Then, the angle $\beta$ is determined from $$\beta = \alpha \times \frac{W_2}{W_1 + W_2}$$

and then, the interpolated direction vector DIR is determined from $$DIR = DIR_1 \times \frac{\sin(\alpha - \beta)}{\sin\alpha} + DIR_2 \times \frac{\sin\beta}{\sin\alpha}.$$

Accordingly, the direction vector $P_{RESULT}$ is determined using an iterative method, as follows. Specifically, given n resolution plane control keys, the direction vectors of those control keys are combined, two at a time, according to the following steps:

(i) $P_{RESULT}$ is set to be equal to $P_{DIR1}$;
(ii) i is set to 1 and steps (iii) and (iv) are performed n−1 times;
(iii) set i to be equal to i+1; and
(iv) interpolate between $P_{RESULT}$ and $P_{DIRi}$ with respective weights $$W = \sum_{x=1}^{i-1} W_x$$

and $W_i$ and store the results in $P_{RESULT}$.

The IK animation engine then orients the resolution plane of the solution it found for the chain by rotating the solution around the axis going through the root and the effector, such that $P_{RESULT}$ has the appropriate relationship to the resolution plane, i.e. $P_{RESULT}$ is contained by the resolution plane, is perpendicular to the resolution plane of the chain, etc.

As will be apparent to those of skill in the art, shape controls and resolution plane controls are independent of each other, and may be employed individually or in combination, as desired by the animator.

Figure 3:
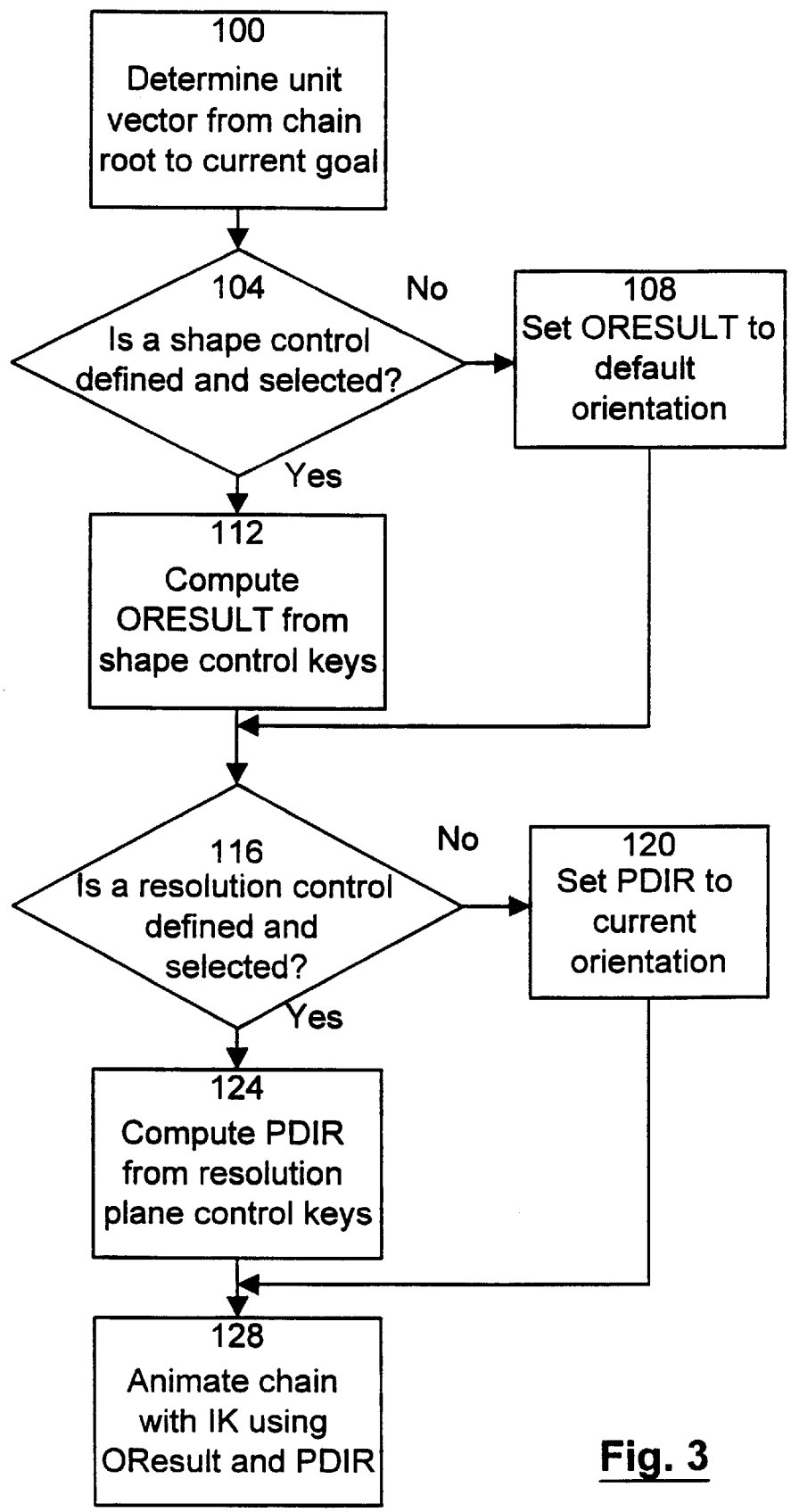
FIG. 3 shows is a flowchart representing the use of behaviours with articulated chains in accordance with the present invention.

FIG. 3 shows a flowchart of the use of the present invention. At step 100, $G_{DIR}$ is determined as the unit vector from the chain root to the current goal. A determination is made, at step 104, as to whether the animator has specified that a shape control should be used as a constraint when animating the chain. If the animator has not so specified, $O_{RESULT}$ is set to a default list of preferred orientation for each limb at step 108. This default list of preferred orientation for each limb is typically defined when the chain was created, and can have been modified subsequently by the animator, if desired.

If at step 104 it was determined that the animator has specified that a shape control should be employed, $O_{RESULT}$ is determined at step 112, via the process described above. Next, at step 116, a determination is made as to whether the animator has specified that a resolution plane control should be used as a constraint when animating the chain. If the animator has not so specified, $P_{DIR}$ is set to a default direction at step 120. This default preferred direction is typically defined as the z-axis of the joint at the chain root when the chain is defined, and can have been modified subsequently by the animator, if desired.

If at step 116 it was determined that the animator has specified that a resolution plane control should be employed, $P_{DIR}$ is determined at step 124, via the process described above. At step 128, the chain is animated using $P_{DIR}$ and $O_{RESULT}$ as constraints.

As will be apparent to those of skill in the art, articulated chain behaviour will be better defined by specifying a greater number of control keys, either shape or resolution plane keys, for a given articulated chain. However, it is contemplated that the $E_{DIR}$ for such keys need not to be distributed everywhere in the 3D space around the chain root. For example, in some circumstances it can be desired that the behaviour of an articulated chain representing a human right arm be well defined when the end effector goal is in front of the human torso, but it is not required that the behaviour be as well defined when the end effector goal is beside or behind the torso. In such a case, the animator can define several control keys for various end effector goals in front of the torso and only a few (or one or none) for end effector goals beside or behind the torso, as desired.

In the embodiment of the present invention described above, control keys are specified using the effector direction vector $E_{DIR}$, and weights of control keys are determined based on the proximity of the effector direction to the current goal direction. However, it is also contemplated that the distance of the effector from the chain root along $E_{DIR}$ can also be included in control keys and used to modify weightings accordingly. It is contemplated that this will provide additional control of the behaviour of a chain, by allowing control keys to be specified for different distances along the same $E_{DIR}$.

The above-described embodiments of the invention are intended to be examples of the present invention and alterations and modifications may be effected thereto, by those of skill in the art, without departing from the scope of the invention which is defined solely by the claims appended hereto.

We claim:

1. A method of defining a behaviour for an articulated chain which includes a chain root, at least one joint, at least one limb and an end effector by defining a control comprising at least two keys, each key including a a vector, indicating a direction relative to said chain root, and a constraint for use in animating said chain via inverse kinematics, said constraint being a preferred configuration for said articulated chain when said end effector is located in said direction from said chain root.

2. The method of claim 1 wherein said constraint comprises a preferred orientation for each of said at least one limbs in said chain.

3. The method of claim 2 wherein said end effector is positioned in said direction relative to said root and each of said at least one limbs is placed in a preferred orientation and said direction and each of said preferred orientations is extracted to obtain one of said at least two keys.

4. The method of claim 1 wherein said constraint comprises a preferred orientation for a resolution plane, said resolution plane passing through said chain root and said end effector.

5. The method of claim 4 wherein said end effector is positioned in said direction relative to said root and said resolution plane is placed in a preferred orientation and said direction and said preferred orientation is extracted to obtain one of said at least two keys.

6. The method of claim 2 wherein said behaviour further comprises a second control, said second control also including at least two keys, each said key comprising a vector, indicating a direction relative to said chain root, and a preferred orientation for a resolution plane, said resolution plane passing through said chain root and said end effector.

7. The method of claim 1 wherein each said key further includes a distance measured along said direction, said constraint being a preferred configuration when said end effector is located at said distance in said direction from said chain root.

8. A method of animating an articulated chain comprising a chain root, at least one joint, at least one limb and an end effector using inverse kinematics, comprising the steps of:
    (i) defining a control comprising at least two keys for said chain, each said key comprising a vector, indicating a direction relative to said chain root, and a constraint for use in animating said chain via inverse kinematics, said constraint being a preferred configuration when said end effector is located in said direction from said chain root;
    (ii) defining a goal for said end effector;
    (iii) determining a weight for each said key of said control, said weight indicating the degree of correspondence between said direction of said key and the direction between said chain root and said goal;
    (iv) interpolating between said constraints of all said at least two keys according to their relative weights to obtain a resultant constraint; and
    (v) animating said chain with said resultant constraint.

9. The method of claim 8 wherein after step (i) is complete, steps (ii) through (v) can be re-performed as desired.

10. The method of claim 9 wherein said constraint comprises a preferred orientation for each of said at least one limbs.

11. The method of claim 9 wherein said constraint comprises a preferred orientation for a resolution plane, said resolution plane passing through said chain root and said end effector.

12. The method of claim 10 wherein in step (I) at least a second control is defined, said second control also comprising at least two keys, each said key comprising a vector indicating a direction relative to said chain root, a constraint which is a preferred orientation for a resolution plane, said resolution plane passing through said chain root and said end effector.

13. The method of claim 12 further comprising the step of, prior to step (iii), selecting at least one of said controls and determining a default constraint for each control which is not selected, steps (iii) through (v) employing said at least one selected control and said default constraints.

14. The method of claim 11 where in step (iv) said interpolation is performed by converting said orientation from a first representation to a unit quaternion representation, interpolating said unit quaternion representations and converting the results of said interpolation back into said first representation.

15. The method of claim 14 wherein in step (iv) said interpolation is performed as spherical interpolation.

16. The method of claim 8 where in step (i) each said key further includes a distance measured along said direction, said constraint being a preferred configuration when said end effector is located at said distance in said direction from said chain root, and where in step (iii) said determined weight further indicates the correspondence between said measured distance of each said key and the distance of said goal from said chain root.

* * * * *